Aug. 14, 1934.      C. WEEMS      1,970,479
CLEVIS HOOK
Filed June 6, 1933
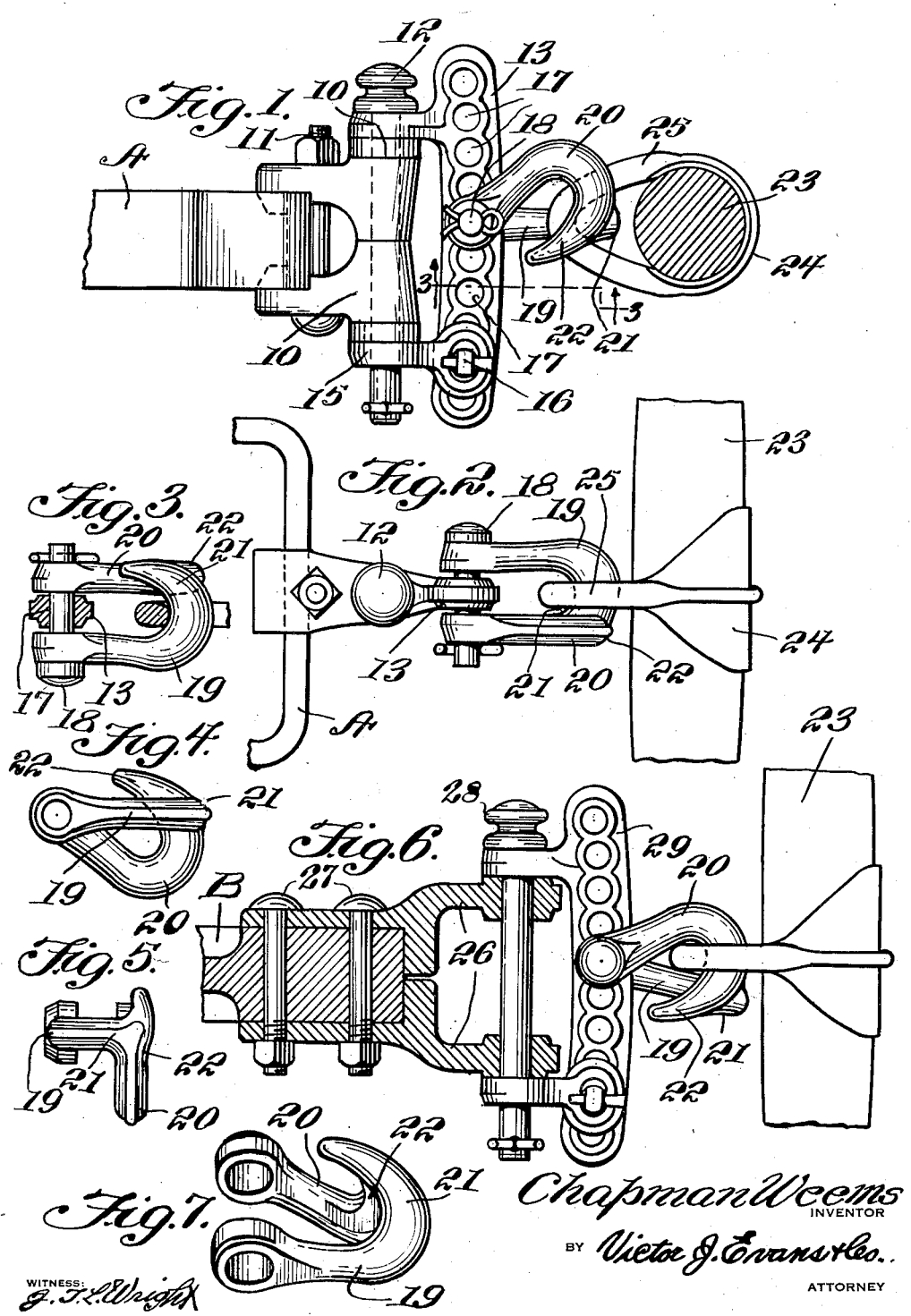

Patented Aug. 14, 1934

1,970,479

UNITED STATES PATENT OFFICE 1,970,479

CLEVIS HOOK

Chapman Weems, Clarksville, Tenn., assignor of one-fourth to Joe B. Weems, Dickson, Tenn., one-fourth to John C. Weems, Southside, Tenn., and one-fourth to George H. Weems, United States Army Application June 6, 1933, Serial No. 674,576

1 Claim. (Cl. 24—230.5)

The invention relates to a clevis hook and more especially to an adjustable double hook.

The primary object of the invention is the provision of a device of this character, wherein there is employed a pair of hooks, these being disposed at substantially right angles to each other and joined at their bills, thus permitting their use for either straight or twisted clevises, the device being adaptable for service with draft implements, particularly plows, cultivators or the like.

Another object of the invention is the provision of a device of this character, wherein these hooks at right angles to each other with the bills merging into each other are supported upon a pivot common to said hooks and such pivot is selectively adjustable upon a mounting or bracket for the carrying of the hooks. Thus these hooks can be raised or lowered upon the mounting or bracket in conformity with a draft line, particularly in their use with a plow or other ground working implement.

A further object of the invention is the provision of a device of this character which is extremely simple in construction, thoroughly reliable and efficient in its purposes, readily and easily adjusted, strong, durable, and inexpensive to manufacture and install.

With these and other objects in view, the invention consists in the features of construction, combination and arrangement of parts as will be hereinafter more fully described in detail, illustrated in the accompanying drawing, which disclose the preferred embodiment of the invention, and pointed out in the claim hereunto appended.

In the accompanying drawing:

Figure 1 is a fragmentary side elevation of a plow beam showing the device constructed in accordance with the invention applied thereto and having a swingle tree coupled thereby.

Figure 2 is a top plan view.

Figure 3 is a sectional view on the line 3—3 of Figure 1.

Figure 4 is a side elevation of those parts shown in Figure 3.

Figure 5 is an end elevation thereof.

Figure 6 is a horizontal sectional view showing a slight modification of the device.

Figure 7 is a perspective view of the hooks of the device assembled and detached from the coupling head.

Similar reference characters indicate corresponding parts throughout the several views in the drawing.

Referring to the drawing in detail, A designates generally a portion of a plow beam which is of conventional form and at its forward end has fitted therewith the companion pintle receiving pieces 10, these being made fast to the beam through the medium of the nut carrying bolt 11 and accommodating the coupling pintle or pin 12 for the pivotal connection of a clevis head piece 13. This clevis head piece 13 has formed therewith the upper pintle eye 14 through which is passed the pintle or pin 12, while the latter carries the lower eye 15 which through a keeper 16 on the head 13 is detachably joined thereto. In this manner the head 13 is pivotally connected with the beam A as will be apparent.

The head 13 is provided with a row of spaced openings or holes 17 in which is selectively engaged a stud clevis pin or pivot 18 carrying a pair of hooks 19 and 20, respectively, these being at substantially right angles to each other and having their bills 21 and 22 merging into one another to present but a single bill to the double hook. The disposition of these bills 21 and 22 of said double hook permits of the coupling of the swingle tree 23 for the proper hitch thereof when used as either a straight or twisted clevis. As is common, the swingle tree 23 carries the usual fastening band 24 having the fastening loop 25.

These hooks 19 and 20 by the pivotal mounting of the same with the clevis head 13 will be disposed in a closing relation to each other, the hitch of the swingle tree 23 being clearly disclosed in Figures 1, 2 and 3 of the drawing.

In Figure 6 of the drawing there is shown a slight modification of the invention, wherein the companion members 26 are secured to the plow beam B by a pair of nut-carrying bolts 27 and the coupling pin or pivot 28 when engaged with these members will be disposed horizontally and likewise the clevis head piece 29 horizontally disposed, while the hook 20 will have the draft hitch engaged therewith for the swingle tree 23.

It is needless to further describe in detail the use of the device because from the foregoing the use should be apparent and for the safe of brevity further description has been omitted.

What is claimed is:

An article of the kind described comprising a hook formed with a double shank and a single bill, the shanks being at an angle, one to the other, to provide crotches to the bill in planes at right angles to each other, and coupling eyes formed on said shanks.

CHAPMAN WEEMS.